No. 786,512.                                             Patented April 4, 1905.

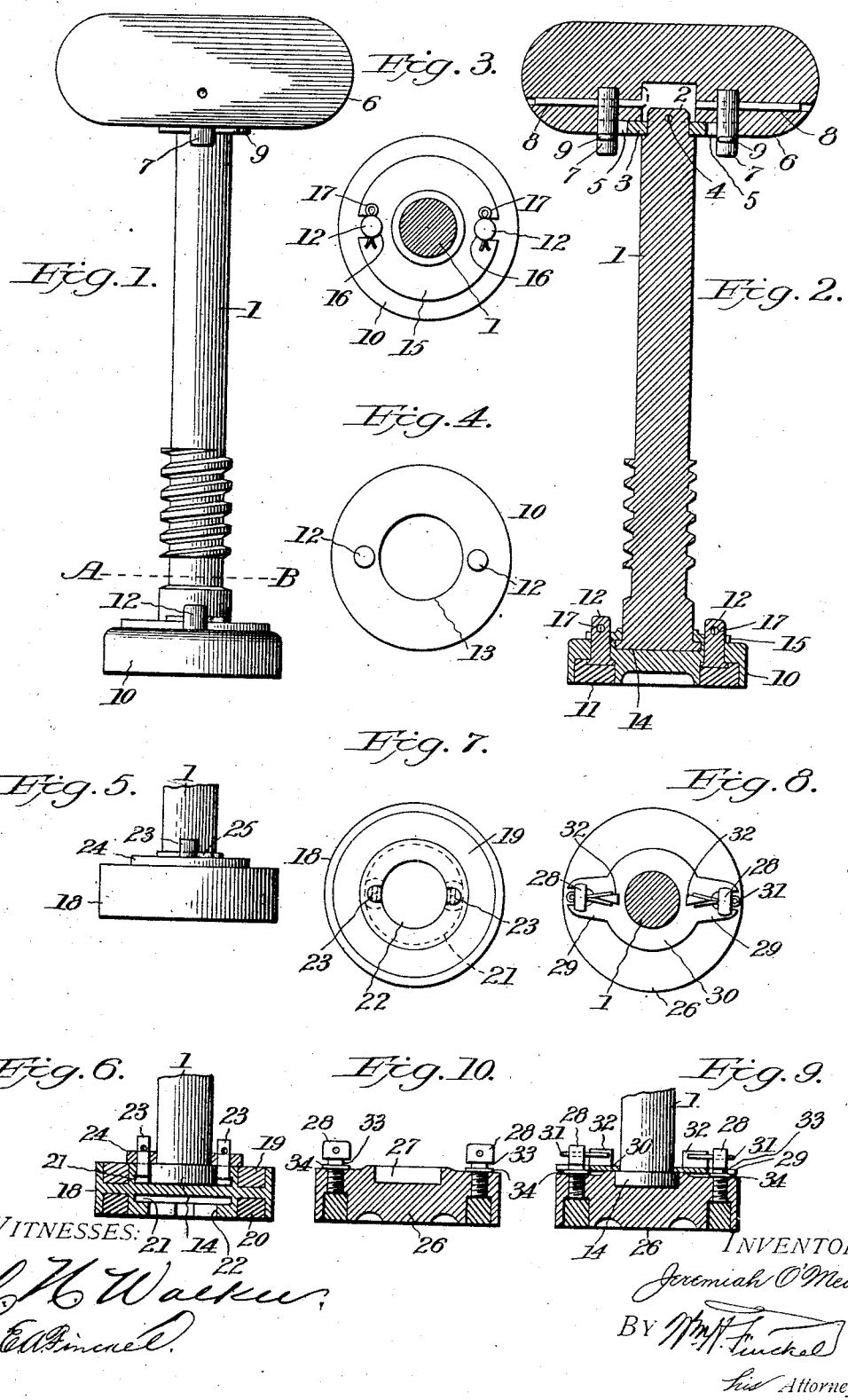

UNITED STATES PATENT OFFICE.

JEREMIAH O'MEARA, OF NEW YORK, N. Y.

VALVE.

SPECIFICATION forming part of Letters Patent No. 786,512, dated April 4, 1905.

Application filed January 19, 1904. Serial No. 189,701.

*To all whom it may concern:*

Be it known that I, JEREMIAH O'MEARA, a citizen of the United States, residing at New York, in the county of New York and State of New York, have invented a certain new and useful Improvement in Valves, of which the following is a full, clear, and exact description.

In order to prevent malicious and mischievous removal of the knobs or hand-wheels of radiator-valves and other valves in heating systems and other installations employing valves, it is desirable to conceal the means used for attaching the knobs or hand-wheels to the valve-spindle and yet admit of the ready removal of said knobs or hand-wheels by authorized persons. It is also desirable in such installations to have the valve disk or plug readily removable for renewal, reversal, and other purposes.

In accordance with the foregoing this invention has a twofold object in view—namely, to supply the valve-knob or hand-wheel with concealed fastenings and to supply means for readily removing or detaching the disk or plug from the spindle.

It may be stated generally that the invention is applicable to globe, angle, and other valves and whether the spindle or stem be screw-threaded or otherwise.

The invention consists of a valve-knob or hand-wheel in which metal pins are sunk and secured therein by concealed fastenings and adapted to coöperate with a plate fastened on the stem to connect the knob or hand-wheel and stem and take the strains incident to operating the valve.

The invention also consists in a valve disk or plug provided with pins adapted to engage a plate connected with the stem in a detachable manner, all as hereinafter more particularly set forth and finally claimed.

In the accompanying drawings, illustrating the invention, in the several figures of which like parts are similarly designated, Figure 1 is an elevation of one form of knob-fastening and disk or plug fastening. Fig. 2 is a longitudinal section taken substantially at right angles to Fig. 1. Fig. 3 is a cross-section taken substantially in the plane of line A B, Fig. 1. Fig. 4 is a plan view of the disk of Figs. 1, 2, and 3. Fig. 5 is an elevation of a modified form of disk or plug fastening. Fig. 6 is a cross-section thereof, and Fig. 7 is a plan view of the disk detached. Fig. 8 is a plan view of another modification of disk or plug fastening with the stem in horizontal section. Fig. 9 is a cross-section with the stem in elevation, and Fig. 10 is a cross-section of the disk or plug detached.

The spindle or stem 1, whether screw-threaded or otherwise, has its upper end 2 squared to receive a plate 3, which is secured thereto by a pin 4, passed through a transverse hole in the stem above the plate. This plate is provided with as many opposite peripheral notches 5 as desired, two being shown. The knob or hand-wheel 6 is provided with as many metal pins 7 as there are notches 5 in the plate 3, and these pins are sunk in the knob or hand-wheel and secured therein by means of transverse concealed fastening-pins 8. The pins 8 may be simply driven in through the sides of the knob or hand-wheel or their inner ends may extend sufficiently far to permit of their being clenched, so as to prevent them working loose, and such clenching is indicated by the dotted line next the inner end of the left-hand pin, Fig. 2. The outwardly-projecting portions of the pins 7 are pierced transversely, and when the knob (recessed on its under side for that purpose) is applied to the plate 3 the pins 7 project through the notches 5, and then the two are connected by cotter-pins 9 or other suitable fastening devices of a more or less permanent character.

By the construction described it will be understood that the outer or exposed portion of the knob or hand-wheel is free of metallic projections and visible fastening devices, and thus the temptation to malicious or mischievous persons to remove the same is absent, while to those authorized to remove these knobs or hand-wheels the concealed cotter-pins 9 are readily accessible.

While I prefer to secure the pins 7 in the knob or hand-wheel by the concealed fastening devices 8, still the invention is not limited to that one means for so securing them.

The disk 10 may be of various forms commonly known with or without packing 11. As shown in Figs. 1 to 4, this disk or plug is provided with headed pins 12, inserted therein from the face side. A central recess 13 is made in the upper or back side of the disk to receive a flange 14 on the end of the spindle 1, and a plate 15 rests upon this flange and has peripheral notches 16, adapted to be alined with the pins 12 and to be connected with said pins by means of cotter-pins or other suitable fastening devices 17 passed through transverse holes in the pins 12 above the plate 15. By taking out the pins 17 the disk may be readily disconnected from the spindle for renewal and other purposes. Of course the disk by this construction is swiveled to the spindle or stem. Another means for securing the disk or plug to the spindle is shown in Figs. 5, 6, and 7, wherein the disk or plug 18 is reversible—that is to say, it is provided with packing 19 20 on opposite faces—and the packing on one face may be suitable for use in water installations, while the packing in the other face may be suitable for steam installations, so that the disk to this extent is interchangeable, or the packing may be of the same kind on both faces, and thus be a true reversible disk. The disk is provided with an undercut groove 21 on each side adjacent a central recess 22, and in this groove headed pins 23 are applied, said pins being held in place by the flange 14 with the stem 1. A notched or perforated plate 24 is applied to the spindle above its flange 14 and is perforated for the passage of the pins 23, and then cotter-pins or other fastenings 25 are passed through transverse openings in the said pins 23 to connect the plate, spindle, and disk in a removable manner. The pins 23 of Figs. 5, 6, and 7 are movable, so that when the valve is to be reversed they may be slipped out of the groove on one side and slipped into the groove on the other side, and, as shown in Fig. 7, the heads of these pins are slabbed off, so as to be concentric with the groove.

Still another modification of which the invention is susceptible is shown in Figs. 8, 9, and 10, wherein the disk 26 has a recess 27 to receive the flanged end of the spindle, and angular headed and grooved screws 28 are tapped in the disk to coöperate with the notched ends 29 of a plate 30 on the spindle, the heads of these screws 28 being oblong and adapted to be turned crosswise of the notched ends of the plate 30, as in Figs. 8 and 9, so as to unite said plate and the disk and to be alined with the notches in the ends of the plate, as indicated in Fig. 10, to permit disconnection of the disk. To insure the screws from turning, their heads are pierced transversely and cotter-pins 31 are inserted through these holes and their free ends spread on wedge projections 32 on the plate. As shown, the heads of these screws are practically T-shaped, so as to cross the notched projections 29, with a groove 33 below the head to receive the notched projections and a flange 34 below this groove to afford rests for these projections and to limit the extent of entrance of the screws into the disk. The screws 28 are merely specific forms of pins, and it is intended to include this construction in those claims wherein the term "pins" is used.

All of the several forms of means of connecting the disk with the spindle in a removable manner are of a simple and economical construction, but entirely efficient and generally applicable to known forms of disks.

It will be observed of the constructions shown in Figs. 1 to 4 and 5 to 7 that the plates fit flush down on top of the disks, while in the form shown in Figs. 8 to 10 there is a slight boss about the recess on which the plate rests in conjunction with the flanges on the screws.

It will be observed that in all of the forms of valve-disks herein shown the pins 12, 23, and 28 are independent of the packing in so far as supporting the packing in place is concerned, and also that said pins are not exposed upon the face of the packing, and hence the extreme width of the face of the packing is available upon the valve-seat. The heads of these pins are not exposed to the deteriorating action of the agent passing through the valve, and reciprocally the pins have no wearing action upon the packing.

What I claim is—

1. A valve-spindle, a peripherally-notched plate thereon, a knob or hand-wheel provided with downwardly-projecting pins, concealed fastenings for said pins, and means to connect the pins and plates.

2. A valve-spindle, a plate, a transverse pin connecting the spindle and plate, said plate provided with peripheral notches, and a knob provided with downwardly-projecting pins, concealed transverse fastenings for said pins, said pins engaging the notches in the plate, and means to connect the pins and plate.

3. A valve-spindle, having a flanged end, a valve-disk recessed to receive such flanged end and provided with a packed face, a plate applied to the flanged end of the spindle next the disk and having notches in its edge, pins having one of their ends secured and concealed within the disk independently of said packed face, and their other ends projecting rearwardly from the back of said disk through the notches in the said plate, and means applied to the pins above the plate to connect said pins and plate.

4. In a valve, a disk having a packed face, a central recess and pins projecting rearwardly from said disk and having one of their ends secured and concealed within said disk independently of said packed face, combined with a valve-spindle having a flange seated in said recess, a loose plate detachably applied to the flange of said spindle and fitted upon said pins, and fastening devices applied to the pins above the plate to connect the pins and plate.

5. In a valve, a reversible disk having a central recess and upwardly-projecting movable pins, combined with a valve-spindle having a flange seated in said recess, a loose plate applied to said spindle and fitted to said pins, and fastening devices to connect the pins and plate.

6. In a valve, a reversible disk having a central recess in each face made with an undercut groove, and movable pins applicable to either recess and the groove therein, combined with a valve-spindle having a flange seated in said recess, a loose plate applied to said spindle and fitted to said pins, and fastening devices to connect the pins and plate.

In testimony whereof I have hereunto set my hand this 18th day of January, A. D. 1904.

JEREMIAH O'MEARA.

Witnesses:
M. F. CLARK,
WALTER W. CLARK.